United States Patent
Braganca et al.

(10) Patent No.: US 6,864,332 B2
(45) Date of Patent: Mar. 8, 2005

(54) PROCESS FOR THE GAS PHASE POLYMERIZATION AND COPOLYMERIZATION OF OLEFIN MONOMERS

(75) Inventors: Antonio Luiz Duarte Braganca, Porto Alegre RS (BR); Antonio Luiz Ribeiro de Castro Morschbacker, Porto Alegre RS (BR); Enio Rubbo, Porto Alegre RS (BR); Cid Neto Miro, Porto Alegre RS (BR); Tamara Barlem, Porto Alegre RS (BR); Arj Mukherjee, Alberta (CA)

(73) Assignees: Braskem S.A., Camacari (BR); Convex International, Calgary (CA)

( * ) Notice: Subject to any disclaimer, the term of this patent is extended or adjusted under 35 U.S.C. 154(b) by 112 days.

(21) Appl. No.: 10/149,004

(22) PCT Filed: Dec. 29, 2000

(86) PCT No.: PCT/BR00/00156

§ 371 (c)(1),
(2), (4) Date: Sep. 10, 2002

(87) PCT Pub. No.: WO01/49750

PCT Pub. Date: Jul. 12, 2001

(65) Prior Publication Data

US 2003/0153695 A1 Aug. 14, 2003

(30) Foreign Application Priority Data

Dec. 30, 1999 (BR) .............................. 9906019

(51) Int. Cl.$^7$ .................................................. C08F 2/34
(52) U.S. Cl. ........................... 526/68; 526/90; 526/127; 526/160; 526/329.2; 526/348; 526/348.2; 526/348.4; 526/348.5; 526/336
(58) Field of Search ........................... 526/68, 90, 127, 526/160, 329.2, 348, 348.2, 348.4, 348.5, 336

(56) References Cited

U.S. PATENT DOCUMENTS 3,969,470 A    7/1976  Spiegelman
5,681,908 A *  10/1997 Mehra et al. ................. 526/68

* cited by examiner

Primary Examiner—William Cheung
(74) Attorney, Agent, or Firm—Birch, Stewart, Kolasch & Birch, LLP (57) ABSTRACT

A process for polymerizing monomers in the gas phase, in fluidized bed reactors is described, where unsaturated, gas phase monomers are fed into the reactors in the presence of a mixture of inert diluents having a composition that allows the dew point to be adjusted, this leading to high production rates under stable operation in a non condensed operation mode.

23 Claims, 1 Drawing Sheet

FIG 1

PROCESS FOR THE GAS PHASE POLYMERIZATION AND COPOLYMERIZATION OF OLEFIN MONOMERS

FIELD OF THE INVENTION

The present invention refers to a process for the polymerization of olefin monomers in gas phase reactors. More specifically, the present invention refers to a process for the polymerization and copolymerization of olefin monomers in the gas phase, in fluidized bed reactors, in the presence of a mixture of inert diluents having a composition that leads to the adjustment of the dew point, this making possible to attain high production rates and stable operation in the non condensed mode.

BACKGROUND INFORMATION

The development of the process for the polymerization in gas phase reactors led to the production of a wide range of polymers. The use of a polymerization process in a gaseous fluidized bed significantly lowers energy requirement and capital investment as compared to other processes. A limiting factor in the polymer production rate in a gas phase reactor is the maximum rate at which the exothermic heat of the reaction may be removed from the reactor. Usually, heat removal in gas phase processes is effected through the compression, cooling and reintroduction of a fluid medium in the recycle, usually a gas, which belongs to the reaction system, so that such fluid not only works as the fluidizing medium of the reactor, but also serves as a dispersing heat medium for removing the heat generated within the reactor. Under the point of view of heat exchange, it is advisable that the flow rate of gas be the highest possible. However, in order to prevent the excessive entrainment of solid particles in the gaseous stream withdrawn from the reactor, the linear speed of the gaseous stream related to the cross section of the reactor should not exceed certain limits.

Therefore, one way to maximize the ability of heat removal is, throughout the operation, to reduce to the lowest possible value the temperature of the gaseous feed stream into the reactor. Beforehand it was estimated that the temperature of the recycle gas could not be lowered to values close to the dew point of the stream. The dew point of the recycle stream is that temperature at which the condensation of liquid in the stream starts. It was believed that the introduction of a partially liquefied stream into a gas phase reactor would inevitably result in a series of operating drawbacks and, at extreme situations, where excessive liquid portions would be present in the cooled recycle stream, would lead to the collapse and the solidification of the bed. A stable operation condition of such kind of reactor is characterized by a bed of moving suspended particles which are thoroughly mixed and in a stable state, even when under reactive conditions, without formation of significant amounts of agglomerated particles that may harm the operation of the reactor or of the process steps ahead.

Contrary to such statements, it was found that, under certain conditions, a recycle stream might be cooled to a temperature below its dew point, hence the condensation of a fraction of said recycle stream. Under such conditions, such stream may be reintroduced in the reactor without the occurrence of the operating drawbacks mentioned hereinbefore.

In gas phase polymerization processes, said form of deliberate introduction of a partially condensed recycle stream into the reactor, together with the judicious choice of conditions that provide a continuously stable operating mode is known as operation in the "condensed mode".

The state-of-the-art technique as cited by the patents on the condensed mode operation uses nitrogen in appreciable amounts as the non-volatile constituent of the recycle stream, ethane and methane being also present in smaller amounts. Alkanes such as iso-pentane and n-hexane are typically employed as constituents of relatively low volatility in concentrations, which may induce the required partial condensation.

U.S. Pat. No. 4,543,399 and U.S. Pat. No. 4,588,790 report the condensed mode operation in the production of polyolefins. Said documents indicate further that there are restrictions related to the process operation ability, mainly as regard the limits of the liquid content in the recycle stream throughout the condensed mode operation. The typical suggested range for the condensed mode operation is situated between 2% and 12% by weight of condensed liquid present in the recycle stream.

More recently, U.S. Pat. No. 5,352,749 and U.S. Pat. No. 5,436,304 teach that, under certain more specific and restrictive conditions, it is possible to operate in the condensed mode in the presence of an amount of condensed liquid higher than 17.4% by weight of the recycle stream. Such potential operation mode is known as "super-condensed mode". Its use is motivated by the desire to increase still more the ability of heat removal and therefore to attain production rates ahead of the accepted levels of operation according to the condensed mode as described hereinbefore.

Thus, it can be seen that the as-described gas phase polymerization processes aiming at obtaining high production rates use the condensed mode and super-condensed mode, this entailing a few negative aspects.

It is well known that, while the operation in the condensed and super-condensed modes is beneficial in terms of higher production rates of the reactor, it presents very often a few drawbacks caused by the presence of condensed liquid in the recycle stream. Thus, in certain operating variations of the condensed mode, a non-reactive and relatively non-volatile hydrocarbon such as iso-propane or n-hexane is injected in the reaction circuit in order to promote the condensation.

The presence of such constituents, especially in relatively high amounts, may promote the swelling and adhesion of the polymer particles and tends to be slightly conflicting with the maintenance of a stable process operation. Thus, unfortunately, the state-of-the-art technique employed to promote the levels of condensation in the recycle stream that are required to enter the super-condensed regimen requires such amounts of non-volatile constituents that may harm the stable operation of the reactor. In practical terms, in order to reach higher production rates, the attainment of a higher heat removal ability is not sufficient, since it is also essential to keep a stable operation. In case the stable operation cannot be kept as such, the heat removal ability is no longer the limiting factor for the production rate, while the advantage of the operation in the condensed and super-condensed modes is lost. The difficulties in keeping the process stability in the super-condensed mode as well as the ways of keeping pace with those drawbacks are thoroughly discussed in the said U.S. Pat. No. 5,352,749 and U.S. Pat. No. 5,436,304 mentioned before.

In further variations of the gas phase polymerization process, where comonomers of longer chains and consequently lower volatility such as 1-pentene, 1-hexene or 1-octene are employed in relatively high amounts for copolymerizating with the primary monomer, due to problems related to the suitable heat removal and to the stability of the reactor bed; the combination of the process conditions with the features of such monomers may lead to the partial condensation of said comonomers and to the consequent impossibility to operate the process under high production rates.

On the other hand, a few patents focus on the non condensated operation by modifying the composition of the recycle stream without however any mention nor claim of an increase in the production rate at levels that would approach those of the condensed mode operation.

This way, U.S. Pat. No. 4,469,855 teaches a process for the copolymerization of ethylene in gas phase reactors, where the diluents used are inert gases such as helium, argon, nitrogen or especially ethane. This process is favorably applied for the copolymerization of comonomers having 6 or 8 carbon atoms.

Potential sources of inert gas diluents for concentrating in the reactor may depend specifically on the type of gas. For example, U.S. Pat. No. 5,681,908 teaches of a process, which may provide a source of ethane and propane to the reactor, via the recycling of monomers and saturated hydrocarbons from reactor purge streams. The process comprises a collection of equipment external to the fluidized bed polymerization process, which via methods of absorption and distillation, is able to recover inert gases such as ethane and propane for recycle to the polymerization reaction system. Such an external system may represent a suitable source of inert gases to enable the practice of the present invention.

U.S. Pat. No. 4,525,547 teaches a process for producing copolymers of ethylene and olefins having of from 4 to 10 carbon atoms in gas phase reactors, the process comprising re-circulating and cooling without liquefying the gaseous stream exiting the reactor. In said process, the composition of the gas phase contains as a replacement to nitrogen, a saturated gaseous hydrocarbon, in an amount higher than 1 mole per mole of ethylene, so as to promote a uniform copolymerization while avoiding the condensation of monomers during the cooling of the recycle stream. The saturated gaseous hydrocarbon has between 3 and 6 carbon atoms.

U.S. Pat. No. 5,733,987 teaches a three-stage process for obtaining ethylene polymers and copolymers. Catalyst contact and pre-polymerization steps precede the gas phase step. In the gas phase reactor, the mole composition of the re-circulation stream contains of between 20 and 90% alkanes based on the total gases. The alkanes used have between 3 and 6 carbon atoms. Such modification allows a better reaction control and prevents the formation of aggregated particles.

The feature of such processes, which apply the non condensed mode in the presence of an alkane-containing atmosphere having more than 3 carbon atoms as a replacement to nitrogen, is that they require a high ratio of said alkanes to the gas phase ethylene so as to prevent the condensation of the comonomers. Another drawback is that said processes are limited to the production of polyethylene and its copolymers.

Thus, the patent literature does not describe nor suggest polymerization processes in gas phase reactors leading to the maximization of the limit of the heat removal ability by the recycle stream, and the ensuing maximization of the reactor productivity, while essentially operating in the non condensed mode. Said advantages may be obtained by using a mixture of inert diluents containing at least one light component designed to regulate the dew point and at least one component of intermediate volatility so as to maximize the heat removal ability in the non condensed mode, as a function of the minimum possible cooling temperature of the recycle stream. A process having such features, suitable for polymerizing ethylene and its copolymers as well as propylene and its copolymers, in gas phase reactors which operate in the non condensed mode and with production rates significantly higher than in the conventional mode of non condensed operation, at the same time equivalent or higher than the rates reached by the operation in the condensed mode, while at the same time keeping the stability of the reactor, is described and claimed in the present application.

SUMMARY OF THE INVENTION

The present invention relates to a polymerization process for monomers in the gas phase reactors, in a regimen where the production rates are:

Significantly higher than in a conventional, non condensed operation mode, or;

Equivalent or higher to the production rates reached by the condensed operation mode, while at the same time securing the maintenance of the operation without stability problems in the reactor bed or of entrainment of polymer particles.

The process according to the present invention for polymerization/copolymerization comprises polymerizing/copolymerizing a feed of gaseous olefin monomers under polymerization conditions, in gas phase reactors, in the non condensed mode, where a certain mole fraction of the recycle stream is made up of inert diluents, admixed in certain amounts, said composition being suitable for maintaining the recycle stream completely volatilized while are maximized the heat transport properties.

In the process according to the present invention, the recycle stream is made up of inert diluents, which comprise:

At least one light component, which regulates the dew point;

At least one component of intermediate volatility, the composition of which is suitable for keeping the recycle stream completely volatilized while the heat removal of said stream and the production rate of the reactor are maximized.

Thus, the present invention provides a polymerization process in gas phase reactors, in the non condensed mode, having high production rates while maintaining the reactor stability, where the composition of the inert diluents of the recycle stream is made up of at least one light component, which is designed to regulate the dew point and at least one component of intermediate volatility.

The present invention provides further a polymerization process in the gas phase, in the non condensed mode, having high production rates, wherein the heat removal of the recycle stream is maximized for a certain temperature of the fluid used in the refrigeration and where at the same time is minimized the agglomeration of polymer particles in the interior of the reactor.

The present invention provides further a process for polymerizing monomers in gas phase reactors associated to an outer thermal exchange system, refrigerated by a cooling fluid at a certain temperature, where a certain portion of the gaseous recycle stream is made up of inert components, so that the heat removal ability in the non condensed mode is equal or higher than the heat removal ability in the condensed mode corresponding to a 3% by weight condensation for a same set of process conditions.

The present invention provides still a polymerization process in gas phase reactors, having high production rates in the non condensed mode in which the dew point of the recycle stream is reduced in a controlled way by the presence of at least one inert volatile compound and at least one compound of intermediate volatility, so as to allow the lowering of the temperature of said stream up to the limit imposed by the temperature of the refrigeration fluid, without any condensation of the stream components.

BRIEF DESCRIPTION OF THE DRAWING

FIG. 1 attached illustrates a preferred mode of the invention as a flow sheet. Optionally the process may be operated with two or more gas phase reactors combined in series or in parallel as well as it may contain pre-polymerization reactors, this does not constituting a limiting aspect of the invention.

DETAILED DESCRIPTION OF THE PREFERRED MODES

Broadly, the present invention comprises a process for the polymerization of olefin monomers in gas phase reactors in the non condensed mode in the presence of inert diluents, admixed in certain amounts, so as to lead to the lowering of the recycle stream up to the limit imposed by the temperature of the refrigeration fluid.

Throughout the present specification, the following terms have the meaning as set forth below:

Inert or non-reactive compounds: those are the compounds that do not bear a direct participation in the kinetics of the polymerization reaction under way;

Non condensed or dry polymerization mode: this is the mode where there is no condensation of a portion of the recycle stream during its cooling and the ability of heat exchange by sensible heat is not optimized. The recycle stream is cooled at temperatures above the dew point, this limiting the cooling conditions of the reactor. Such mode may have as main inert nitrogen, ethane or propane. In the examples of the present invention, such operation modes are respectively represented by dry N2, dry ethane and dry propane;

Condensed or super-condensed polymerization mode: this is the mode where the heat exchange by sensible heat is also not optimized, however the recycle stream is cooled at temperatures below the dew point, so as to partially condense its components, increasing the cooling conditions of the reactor, while at the same time imposing limits to the stability of the bed and problems related to particle agglomeration. In the examples of the present invention, said operation modes are represented by cond.;

Super-dry polymerization mode: this is the mode taught by the present invention, where, by introducing a mixture of inert diluents containing at least one light component designed to regulate the dew point and at least one component of intermediate volatility in the recycle stream, it is possible to increase the volatility and the ability of heat exchange by sensible heat. This way the recycle stream may be cooled to lower temperatures without condensation as a function of the lowering of the dew point until the limits imposed by the temperature of the cooling fluid, the cooling rate and the reactor productivity being thus increased. In the examples of the present invention such operation mode is represented by super-dry;

Light components designed to regulate the dew point: in the present invention, these refer to nitrogen, argon and ethane, isolated or combined, where at least one of those is mandatory a portion of the recycle stream, aiming at preventing the condensation of a portion of said stream, especially the condensation of the less volatile comonomers, while maintaining a high heat removal rate. In situations of high monomer volatility, such as for example in the homopolymerization of ethylene, propane may also be designed to regulate the dew point;

Intermediate volatility components: in the present invention, those are the alkanes of 3 to 6 carbon atoms and non-reactive olefins of 4 to 6 carbon atoms. Examples of said components are propane, n-butane, iso-butane, iso-pentane, neo-pentane, n-pentane, cyclo-pentane, cis-butene-2, trans-butene-2, cis-pentene-2 and trans-pentene-2, isolated or admixed, where at least one of them is a mandatory part of the recycle stream.

The present invention is not limited to any particular type of olefin polymerization reaction in the gas phase, but is particularly suitable to the polymerization reactions which involve olefin monomers, specially the homopolymerizations and copolymerizations of ethylene and propylene with other alpha-olefins such as 1-butene, 1-pentene, 1-hexene, 4-methyl-1-pentene, 1-octene, 1-decene, other linear or branched alpha-olefins having of from 4 to 12 carbon atoms, and styrene. Other monomers may include polar vinyl's, conjugated and non-conjugated dienes, aldehyde monomers and acetylene.

Polymerization catalysts useful in the present invention are high activity catalysts such as coordination anionic catalysts, cationic catalysts, free radical catalysts, catalysts employing a transition metal, metallocenes reacted with an alkyl or alcoxy metal compound, or with an ionic compound. Such catalysts include precursor compositions that are partially or completely activated and those catalysts modified by pre-polymerization or any similar technique for the catalyst conditioning.

In the preferred practice of the present invention, an improved process for the polymerization in gas phase reactors, advantageously suitable for producing polyethylene and its copolymers and polypropylene and its copolymers, is performed under conditions where polymerization catalysts of inherently high activities are employed.

Further, the reaction is performed under an operation mode where the fraction of the recycle stream should be made up of non-reactive gaseous compounds. Such fraction is made up of selected components, among which there are at least one light component designed to regulate the dew point and at least one component of intermediate volatility, the concentrations of which are specified so that the ability of heat removal of the reaction circuit is augmented to a level that is at least equivalent to the ability of heat removal in the condensed mode corresponding to 3% by weight of liquid in the recycle stream for a normal set of process conditions.

In spite of the fact that the present invention is not limited to any specific type of polymerization reaction nor to the use of a specific type of reactor, the following discussion on the operation of the improved process is directed to the polymerization of olefin monomers in gas phase reaction systems. The preferred gas phase reactors are the vertical fluidized beds or horizontal fluidized bed reactors, such as is known from state-of-the-art documents. Analogously, other types of gas phase reactors such as mechanically stirred horizontal or vertical bed reactors may be used employing the principles of the present invention.

It is obvious that other unsaturated monomers, isolated or admixed, may be successfully polymerized according to the principles of the present invention, the process conditions being accordingly adapted based on well-known principles.

There are no known methods on how the cooling ability in the conventional non condensed mode may be increased so that it is equivalent or higher to the level of said ability in the condensed mode, while the operating conditions of the gas phase polymerization such as the maximum allowed volume flow rate of the gas, the maximum allowed temperature of the reactor bed or the minimum cooling temperature of the recycle stream are respected.

One of the desired features is that the dew point of the mixture of the recycle gas may be somehow reduced so that the temperature differential of the recycle gas between the reactor inlet and exit may be maximized, while still keeping the temperature at the reactor inlet above the dew point of the stream. However, for several reasons, if only this point is secured this will not suffice for the maximization of the ability of heat removal in the non condensed mode.

For example, it is common to observe that while the temperature at the reactor inlet is reduced in the non condensed mode, the resulting improvement in the heat removal ability is not significant because the means that is used to reduce the dew point may also cause simultaneously certain drawbacks to other properties of the gas that are critical for the improvement in the heat removal ability, such as the specific heat, the specific weight and the thermal conductivity. An example of such situation is when in an operation in the condensed mode, a non-volatile, non-reactive component of the recycle stream, such as iso-pentane, is partially or completely replaced by another one, highly volatile and non-reactive such as nitrogen in a certain operating condition without obtaining any improvement in the productivity of the system.

On the other hand, the temperature of the refrigeration fluid limits the reduction of the temperature of the recycle stream. Such fluid, usually water, is refrigerated in cooling towers by direct contact with air. The minimum temperature that it may reach depends on external factors such as the ambient temperature and the relative humidity of the air. Most of the time, the practical limits for refrigerating said fluid are situated between 15° C. and 35° C., this corresponding to a possible minimum cooling temperature of the recycle stream between 20° C. and 50° C.

Temperatures below those limits could only be reached by using cooling units, the use of which is impaired by the high operating cost.

Thus, in order to improve the ability of heat removal through the non condensed mode in the process of the invention, the composition of the recycle gas stream should be such that the dew point of the mixture is reduced up to the maximum cooling limit of the recycle stream that is allowed by the ambient conditions, while the critical thermo-physical properties of the stream are kept as such or improved.

The present invention demonstrates that in the recycle stream, besides the monomers present in the reaction, the presence of two kinds of non-reactive compounds is required.

The first kind is made up of light components designed to regulate the dew point, aiming at the maximum reduction of the temperature of the condensed phase of the recycle stream, while the limit imposed by the temperature of the refrigeration fluid is respected. In the present invention, said light components comprise nitrogen, argon and, preferably, ethane isolated or admixed, wherein at least one of them is a mandatory portion of the recycle stream. Possibly, propane may also be utilized as the regulating agent of the dew point when combined to another light component.

The second kind is made up of components of intermediate volatility, aiming at maximizing the value of certain properties of the gaseous stream, such as specific heat, specific weight and thermal conductivity. In the present invention, said intermediate volatility components comprise alkanes of 3 to 6 carbon atoms and non-reactive olefins of 4 to 6 carbon atoms. Exemplary of said components are propane, n-butane, iso-butane, iso-pentane, neo-pentane, cyclo-pentane, cis-2-butene, trans-2-butene and cis-2-pentene, isolated or admixed, where at least one of them is a mandatory portion of the recycle stream.

The applicability of said non-reactive compounds occurs at any concentration; preferably, the molar concentration of each of said compounds based on the main monomer is below 6:1.

For example, it was found that by securing a suitable balance between the properties of the recycle stream mentioned above, the present invention may yield abilities of heat removal that are equivalent or higher than those of the condensed mode, even under conditions where the limiting factor is the outer system of thermal exchange and not the thermodynamical conditions of the reactor.

Broadly, in the condensed mode, when comonomers of longer chain olefins are used in the process, there is no need to add compounds such as iso-pentane or hexane since the olefin comonomers by themselves are able to cause the condensation. However, on operating in a non condensed mode, the presence of longer chain olefins and, consequently, having relatively high boiling points causes the increase of the dew point of the recycle stream, so that the ability of the sensible heat removal is undesirably reduced. Advantageously, it was found in the present invention, that the adjustment of the dew point of the recycle stream by means of the control of the composition of the inert compounds present in said stream, leads to the minimization of the drawbacks related to heat removal when operating with longer chain olefin comonomers in the non condensed mode.

According to one preferred mode of the invention, a high activity catalyst is used, more specifically having average activity higher than 500 grams of polymer per gram of catalyst per hour per bar of monomer partial pressure. In this case, such catalyst is employed in low ratios between the main monomer and the inert components, preferably the molar ratio between the main monomer and the inert components being between 1:1 and 1:6. Said arrangement makes possible to reduce the comonomer concentration in the recycle stream for a certain end product and consequently, obtain a reduction in the dew point of the recycle stream without sacrificing the required product specifications, particularly as regards the specific weight of the polymer.

In the present invention, the aim when using an intrinsically high activity catalyst is to secure that, in spite of employing an artificially low monomer concentration, it is possible to generate a polymer amount per catalyst unit such that the catalyst residue in the polymer obeys to accepted specifications. In the practice of the invention, it is advisable that the process is operated in a manner such that the catalyst productivity attains at least 2,000 grams of polymer per gram of catalyst on a continuous basis and preferably this figure attains 3,000 grams of polymer per gram of catalyst.

Among the catalysts useful to that aim are the catalysts based on organic and inorganic chromium salts, the metallocene catalysts and the titanium chloride catalysts of the Ziegler-Natta type. Preferably those catalysts contain one or more electron donor compounds such esters, ethers and organo-silanes. Said catalysts may be activated by alkyl-aluminum compounds and supported on magnesium chloride or silica. Optionally the catalysts may be pre-polymerized.

The state-of-the-art knowledge is that intrinsic high activity catalysts, however efficient in many ways, are harmful to the process operation under conditions that require a great deal of heat removal, especially in a non condensed operation mode. In opposition to the state-of-the-art technique, the present invention allows the use of intrinsic high activity catalysts without the usual drawbacks, by operating the process under a new mode, which comprises the increase in the heat removal ability in a non condensed operation mode.

As said before, the ability to operate under conditions of economical production avoiding the formation of liquid in the recycle stream renders the process of the invention more advantageous if compared to the condensed mode operation, in terms of operation flexibility, process stability and product quality, as a consequence of the swelling and the adherence of the polymer particles caused by the partial absorption of the formed liquid.

In the copolymerization involving longer chain olefins, the problems of swelling and adherence of polymer particles may arise specially in copolymers having specific weight values lower than 0.920 g/cm3, this being due not only to the high solubility of said comonomers in the polymer, but also to the great affinity of the copolymers themselves to the soluble hydrocarbons. Frequently, these drawbacks are a limitation of the production rates of this kind of products. Through the practice of the present invention, it will become clear that, even at high production rates, it is possible to avoid the condensation of the comonomer, leading to a reduction in the swelling of the polymer particles and the consequent advantage of reducing the operating drawbacks.

The amount and the nature of the non-reactive compounds chosen in the practice of the present invention depend on many parameters. In the absence of limits for the heat transfer imposed by the outer refrigeration system, it will be typically advantageous to operate with smaller amounts of intermediate volatility components and larger amounts of light components designed to regulate the dew point in the non-reactive fraction of the recycle stream. If, however, there are limits from the outer refrigeration system such as those that might occur, for example, in climates where the temperature of the cooling water is high, or when the heat exchanger is in bad shape, then it will be advantageous to use higher amounts of intermediate volatility components while reducing the concentration of light components designed to regulate the dew point.

In view of the previous considerations, the present invention utilizes in the composition of the gaseous recycle stream a mixture containing between 3% and 97% molar, preferably between 10% and 90% molar, of light components designed to regulate the dew point, said amount being based on the total amount of non-reactive components.

In a great number of situations where the present invention may be advantageous, it was found that the ability of heat removal in the resulting non condensed mode may be equivalent to the level of the ability of heat removal corresponding to high condensation levels in the condensed mode operation. It was found that, in general, the present invention may lead to abilities of removal of sensible heat higher than the removal in the form of latent heat in a condensed mode operation that contains more than 3% by weight liquid and, in certain cases, even more than 15% by weight liquid.

The advantages of the improved process of the invention may be applied to any exothermic, olefin polymerization reaction, in a gas phase reaction system. Generally, the advantages of said process are the broader as is larger the distance of the temperature of the cooling water and, consequently, of the dew point of the recycle stream relative to the reaction temperature in the interior of the bed, this being obtained and controlled by introducing in the recycle stream a mixture of inert components having a typical composition, as taught in the specification of the present invention.

Figure 1:
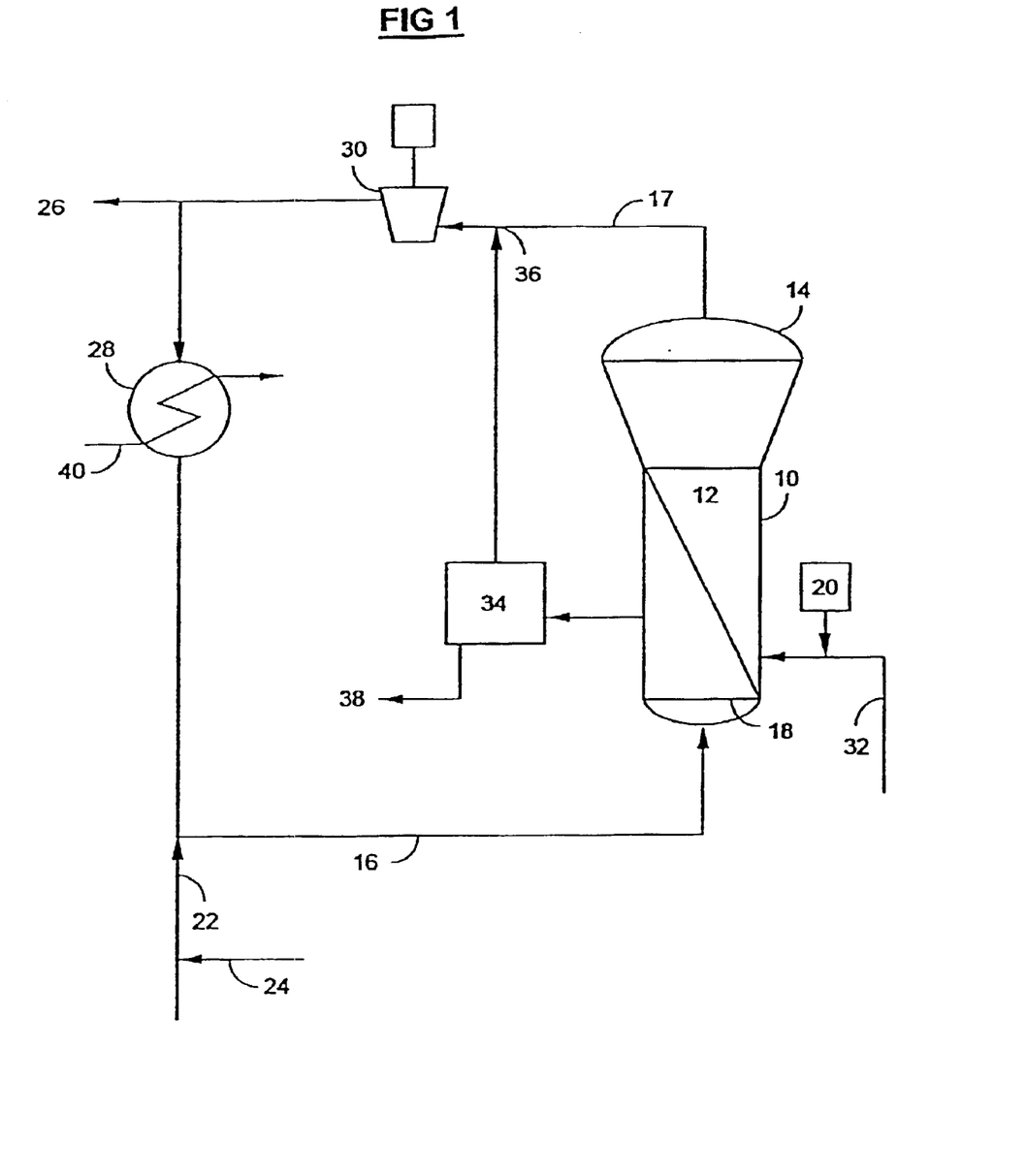

A reaction system in a gas fluidized bed is illustrated in FIG. 1 attached. It should be borne in mind that the reaction system shown in FIG. 1 is a non-limiting example, the present invention being adequate to any conventional system of gas phase reaction.

Referring now to FIG. 1, reactor 10 includes the reaction zone 12 and a desengagement zone 14 where the speed of the gas is reduced. The relationship between the height and the diameter in the reaction zone 12 varies as a function of the desired residence time in the process and of the maximum height beyond which excessively large gas bubbles will form in higher heights in the interior of the reaction zone 12. The bed of polymer particles in reaction zone 12 is kept in a fluidized state by recycle stream 16 that works for fluidizing the medium as well as for dissipating heat for absorbing the exothermic heat generated inside the reaction zone 12. The bed of polymer particles in reaction zone 12 is kept in fluidized state by recycle stream 16 that works as a fluidizing medium as well as a dissipating heat agent for absorbing the exothermal heat generated within reaction zone 12. Recycle stream 16 after entering reaction zone 12 through distributing plate 18, is distributed so as to promote the maintenance of adequate fluidization. The superficial velocity of the gas, resulting from the flow rate of recycle stream 16 within reactor 10, typically should not exceed 1.0 m/s so as to avoid excessive entrainment of polymer particles beyond the freeing zone 14. Stream 17, which contains the gas discharged from freeing zone 14, said gas having a low monomer content, is fed to the suction of compressor 30 of the recycle gas, so as to provide the driving force for the flow of stream 17. The combined reaction and compression heat are then removed from recycle stream 17 in external heat exchange system 28 that is typically a heat exchanger refrigerated by a cooling fluid 40. The composition of stream 17 is periodically tested with the aid of an analyzer 26 from the gaseous sample obtained from stream 17.

Make-up fluids are fed to the system at spot 22 so as to make up the composition of recycle stream 16. So, make-up stream 22 will include the compounds and the co-catalysts that directly participate in the reaction as well as the selected non-reactive compounds required for the practice of the present invention, those being added at spot 24. However, other spots of the gas recycle system, are equally suitable for introducing said streams, according to the practice of the invention.

The polymerization catalyst is introduced into reactor 10 in a site within the reaction zone 12, at a vertical distance from distributing plate 18, chosen so as to promote the maintenance of an ideal distribution in the residence time of the catalyst. A mixture of non-reactive compounds 32, of the same or different composition from stream 24, may be used to aid in the flow of catalyst into the reactor. The mixture of non-reactive compounds 32 is chosen so that, together with the similar compounds that are being introduced in the system through spot 24, allows that the improved process of the invention may be practiced under the desired advantages. The catalyst material is stored and fed from the catalyst feeding system 20.

The produced polymer is discharged from the reaction zone through a discharge system 34 that promotes the recovery of the reactive and non-reactive gases, feeds said gases back to the recycle stream 16 at spot 36 and lowers the pressure of the discharged mixture of polymer and gases at an adequate pressure for later conveying of the produced polymer particles 38 for downward processing.

The present invention will now be illustrated by the following Examples, which should not be construed as limiting same.

EXAMPLES

The difficulty in the reproducing in the industrial scale the phenomena observed in the pilot scale is well known. Thus, experts turn to methods that involve the computer-based mathematical simulation of process equipment as well as the respective physical and chemical phenomena, such as it occurs relative to the ability of heat removal from the process. In order to better understand the present invention, including the limitations and advantages that are the featured by same, examples are listed below related to the tests that were effected based on rigorous models of the process, such models representing the present invention. Comparative examples are also shown. So, the experimental advantages of process stability streams for the present invention based on the condensed mode operation, will not be found here.

Example 1

In this example, a polymerization process in fluidized bed was used to carry out the polymerization of ethylene and 1-butene in the non condensed mode, subject to the following common parameters:

| | |
|---|---|
| Reactor diameter: | 4.75 meters |
| Height of the bed | 13.3 meters |
| Absolute pressure of the reactor | 2.4 bar |
| Reactor temperature: | 88° C. |
| Specific activity of the catalyst | 1,030 g polymer/g catalyst/h/bar of monomer pressure |
| Superficial velocity of the recirculation gas: | 0.75 m/s |
| Minimum limit temperature for cooling the recirculation gas: | 35° C. |

Data of this Example demonstrate that through the practice of the present invention, herein called super-dry (Example 1c), it is possible to increase the production proportionally to the heat removal ability of the recycle stream, when compared to the normal mode of dry operation using a nitrogen-rich (Example 1a) or ethane-rich (Example 1b) inert diluent, without the presence of intermediate volatility alkanes. In this example, the data illustrate the heat removal ability in the non condensed mode for a limiting cooling temperature of 35° C.

In this example, the reactor variables that are kept constant are the temperature of the reactor bed, the concentrations of hydrogen, monomer and comonomer in the recycle stream, the inlet temperature of the recycle stream in the reactor and the reactor pressure.

The values related to example 1 are listed in TABLE 1 below.

TABLE 1

| | Example Number | | |
|---|---|---|---|
| | 1a | 1b | 1c |
| Nominal Melt Flow Rate of Resin (dg/10 min) | 1.0 | 1.0 | 1.0 |
| Nominal Specific Weight of Resin (g/cc) | 0.918 | 0.918 | 0.918 |
| Typical Composition - Recycle Stream (mole %): | | | |
| Hydrogen | 5.63 | 5.63 | 5.63 |
| Nitrogen | 31.02 | — | — |
| Methane | 0.50 | 0.50 | 0.50 |
| Ethylene | 45.00 | 45.00 | 45.00 |
| Ethane | 3.00 | 34.02 | 27.20 |
| Propane | — | — | 6.82 |
| 1-Butene | 14.85 | 14.85 | 14.85 |
| Dew Point of the Recycle Stream (° C.) | 23.0 | 28.3 | 32.0 |
| Inlet Temperature in the Reactor (° C.) | 35.0 | 35.0 | 35.0 |
| Operation Mode (dry/condensed) | dry $N_2$ | dry ethane | super-dry |
| Liquid Content-Recycle Stream-(% weight) | — | — | — |
| Heat removed In the cooler of the recycle stream ($10^8$ kJ/h) | 1.025 | 1.33 | 1.38 |
| Production Rate of the Reactor (t/h) | 28.7 | 37.3 | 38.7 |
| Catalyst Productivity (g polymer/g cat) | 26,400 | 20,320 | 19,580 |

Example 2

In this Example, a process for polymerizing in a fluidized bed was used to conduct the copolymerization of ethylene and 1-butene in the non condensed as well as in the condensed mode, subject to the following common parameters:

| | |
|---|---|
| Reactor Diameter: | 4.75 meters |
| Height of the bed: | 13.3 meters |
| Absolute Pressure in the reactor: | 22.4 bar |
| Reactor Temperature: | 88° C. |
| Specific Activity of the catalyst: | 1,030 g polymer/g catalyst/h/bar of monomer pressure |
| Superficial Velocity of the recirculation gas: | 0.75 m/s |
| Limiting Minimum Temperature to which the recirculation gas may be cooled: | 35° C. |

Data of this Example illustrate that by the practice of the present invention (Examples 2d–2e) where the best composition of the gaseous mixture designed for the control of the dew point is worked, it is possible to increase production proportionally to the ability of heat removal of the recycle stream, when compared to the normal dry operation mode using an isolated ethane-rich (2a) or propane-rich (2b) inert diluent. In this Example, item 2a of the dry mode illustrates the heat removal ability in the non condensed mode for a limiting cooling temperature of 35° C. and item 2b of the dry mode illustrates the ability of heat removal in the non condensed mode by cooling the recycle stream in the reactor inlet at a temperature that is 3° C. higher than the dew point of said stream. For the sake of illustration, the limiting temperature in the non condensed mode (2c) and in the super-dry mode of the example 2e was reduced to 25.8° C.

In the condensed mode operation, condensation is induced through the usually practiced method for copolymerizing ethylene and 1-butene, keeping all other relevant reactor variables as constant as possible, while introducing iso-pentane in the recycle system until the desired level of the heat removal ability is attained. Even in this case it is possible to attain heat removal and production rates equivalent to the condensed mode with 10% condensation (Example 2c) even when the cooling temperature of the super-dry mode (Example 2d) is limited. By leveling the cooling of the recycle stream at the same temperature (25.8° C.) with the mode at 10% condensation, the rates of heat removal and production of the super-dry mode (Example 2e) are higher.

The reactor variables kept constant in this Example are the temperature of the reactor bed, the ratio between the concentrations of hydrogen, monomer and comonomer in the recycle stream and the reactor pressure.

It is found that the catalyst productivity is approximately 5,500 g/g in Example 2d where the preferred mode of the invention is practiced, this being higher than the minimum recommended range of from 2,000 to 3,000 g/g.

The figures related to Example 2 are listed in TABLE 2 below.

Example 3

In this Example, a process for polymerizing in a fluidized bed was used to run the copolymerization of ethylene and 1-hexene in the non condensed as well as in the condensed mode, subject to the following common parameters:

| | |
|---|---|
| Reactor Diameter: | 4.75 meters |
| Height of the bed: | 13.3 meters |
| Absolute Pressure in the reactor: | 22.4 bar |
| Reactor Temperature: | 88° C. |
| Specific Activity of the catalyst: | 600 g polymer/g catalyst/h/bar of monomer pressure |
| Superficial Velocity of the recirculating gas: | 0.75 m/s |
| Limiting Minimum Temperature to which the recirculating gas may be cooled: | 35° C. |

Data from this Example are analogous to those of Example 1, except for the use of 1-hexene, in a lower concentration, as a monomer for copolymerizing with ethylene. In this Example, a catalyst of significantly lower specific activity as compared to other examples, is employed. The chosen activity of 600 g of polymer/g catalyst/h/bar of monomer pressure is close to the minimum recommended value of 500 g polymer/g catalyst/h/bar of monomer pressure. However, even under such circumstances, in Example 3e, which represents the preferred practice of the present invention, the productivity of the catalyst is higher than 3,000 g polymer/g catalyst.

As in the previous Example, Example 3e, super-dry, also evidences the higher ability of heat removal as compared to other examples of the non condensed mode (3a, 3b and 3c).

In the condensed mode (3d), the condensation is induced by reducing the inlet temperature of the recycle stream, this

TABLE 2

| | Example Number | | | | |
|---|---|---|---|---|---|
| | 2a | 2b | 2c | 2d | 2e |
| Nominal Melt Flow Rate Resin (dg/10 min) | 1.0 | 1.0 | 1.0 | 1.0 | 1.0 |
| Nominal Specific Weight of Resin (g/cc) | 0.918 | 0.918 | 0.918 | 0.918 | 0.918 |
| Typical Composition-Recycle Stream (mole %): | | | | | |
| Hydrogen | 1.88 | 1.88 | 5.63 | 1.88 | 1.88 |
| Nitrogen | — | — | 28.54 | — | — |
| Methane | 0.50 | 0.50 | 0.50 | 0.50 | 0.50 |
| Ethylene | 15.00 | 15.00 | 45.00 | 15.00 | 15.00 |
| Ethane | 77.67 | — | 3.00 | 45.67 | 60.30 |
| Propane | — | 77.67 | — | 32.00 | 17.37 |
| 1-butene | 4.95 | 4.95 | 14.85 | 4.95 | 4.95 |
| iso-pentane | — | — | 2.48 | — | — |
| Dew Point of the Recycle Stream (° C.) | 9.3 | 55.0 | 35.7 | 32.0 | 22.8 |
| Inlet Reactor Temperature (° C.) | 35.0 | 58.0 | 25.8 | 35.0 | 25.8 |
| Operation Mode (dry/condensation) | dry ethane | dry propane | cond. | super-dry | super-dry |
| Liquid Content - Recycle Stream % weight | — | — | 10 | — | — |
| Heat removed in the cooler of the recycle stream ($10^8$ kJ/h) | 1.34 | 1.22 | 1.65 | 1.63 | 1.76 |
| Production Rate of the Reactor (t/h) | 37.6 | 34.2 | 46.3 | 45.7 | 49.4 |
| Catalyst Productivity (g polymer/g cat) | 6,720 | 7,390 | 16,360 | 5,530 | 5,110 | being the practice when 1-hexene is used as comonomer and when the outer heat exchange system is able to suitably remove heat to reduce the temperature as desired in the recycle stream. For the sake of illustration, the limit temperature in the non condensed mode (3d) was reduced to 26.9° C.

In order to reduce the dew point, the concentrations of hydrogen, monomer and comonomer in Examples 3c and 3e were reduced to one third.

The reactor variables kept constant in this Example are the reactor bed temperature, the ratio between the concentrations of hydrogen, monomer and comonomer in the recycle stream, the inlet temperature of the recycle stream into the reactor and the reactor pressure.

The figures related to Example 3 are listed in TABLE 3 below.

nitrogen (4a), as well as in the dry mode with ethane (4b), the cooling limit until the dew point cannot be met, since the maximum cooling limit is the temperature of 30° C. In the Example of the dry case with propane (4c), the minimum limit operating temperature of 30° C. is not reached, since the dew point of the stream is 41.7° C. and the operating temperature is set at 3° C. beyond this value. In the Example of the super-dry mode (4d), which represents the practice of the present invention, the diluent used s a mixture having an adequate ratio between ethane and propane aiming at adjusting the volatility, so that the dew point would be 27° C., allowing the operation at 30° C. In the condensed mode (4e), n-hexane was used as a condensation promoter. However in this case, the limiting cooling temperature of 30° C. was not respected in order to make possible to represent the operation with 13% condensation of said stream. For the sake of

TABLE 3

| | Example Number | | | | |
|---|---|---|---|---|---|
| | 3a | 3b | 3c | 3d | 3e |
| Nominal Melt Flow Rate - Resin (dg/10 min) | 1.0 | 1.0 | 1.0 | 1.0 | 1.0 |
| Nominal Specific Weight of Resin (g/cc) | 0.918 | 0.918 | 0.918 | 0.918 | 0.918 |
| Typical Composition-Recycle Stream (mole %): | | | | | |
| Hydrogen | 5.63 | 5.63 | 1.88 | 5.63 | 1.88 |
| Nitrogen | 40.92 | — | — | 40.92 | — |
| Methane | 0.50 | 0.50 | 0.50 | 0.50 | 0.50 |
| Ethylene | 45.00 | 45.00 | 15.00 | 45.00 | 15.00 |
| Ethane | 3.00 | 43.92 | 80.97 | 3.00 | 71.47 |
| Propane | — | — | — | — | 9.50 |
| 1-Hexene | 4.95 | 4.95 | 1.65 | 4.95 | 1.65 |
| Dew Point of the Recycle Stream (° C.) | 55.0 | 55.2 | 27.8 | 55.0 | 32.0 |
| Inlet Temperature in the Reactor (° C.) | 58.0 | 58.2 | 35.0 | 26.9 | 35.0 |
| Operation Mode dry/condensation | dry N$_2$ | dry ethane | dry ethane | cond. | super dry |
| Liquid Content Recycle Stream- (% weight) | — | — | — | 10 | — |
| Heat removed in the cooler of the recycle stream (10$^8$ kJ/h) | 0.52 | 0.72 | 1.32 | 1.39 | 1.40 |
| Production Rate of the Reactor (t/h) | 14.6 | 20.2 | 37.0 | 39.0 | 39.3 |
| Catalyst productivity (g polymer/g cat) | 30,240 | 21,850 | 3,980 | 11,320 | 3,740 |

Example 4

In this Example, a process for polymerizing in a fluidized bed was used to run the copolymerization of ethylene and 1-hexene in the non condensed as well as in the condensed mode, aiming at producing a polymer useful for molding applications, subject to the following common parameters:

| | |
|---|---|
| Reactor Diameter: | 4.75 meters |
| Height of the bed: | 13.3 meters |
| Absolute Pressure in the reactor: | 22.4 bar |
| Reactor Temperature: | 88° C. |
| Specific Activity of the catalyst: | 700 g polymer/g catalyst/h/bar of monomer pressure |
| Superficial Velocity of the recirculating gas: | 0.70 m/s |
| Limiting Minimum Temperature to which the recirculating gas may be cooled: | 30° C. |

In this Example, the dry and super-dry modes (4a, 4b, 4c and 4d) evidence the thermodynamically possible heat removal ability of the process. Thus, in the dry mode with illustration, the limiting temperature of the condensed mode (4e) was reduced to 12.5° C.

It is observed that in the four non condensed cases (4a, 4b, 4c and 4d), the operation in the super-dry mode presents the highest production rate in the reactor. Even in the case with 13% condensation, the production rate attained was the same as that in the super-dry mode. However, cooling at a much lower temperature was required, which is out of interest.

It may be observed that, in the cases of this Examples that illustrate the invention, the minimum concentration of ethylene in the recycle stream is 20 mole %, corresponding approximately to a partial pressure in ethylene of 4.5 bar. The operation below such level makes difficult to keep a suitable catalyst productivity as a consequence of the relatively low activity, 700 g polymer/g catalyst/h/bar monomer pressure, caused by the effect of the considerable hydrogen concentration present in the system.

In spite of the low activity, the final productivity of the catalyst of Example 4d, which demonstrates the present invention, is around 5,500 g/g.

The figures related to Example 4 are listed in TABLE 4 below.

TABLE 4

|  | Example Number | | | | |
| --- | --- | --- | --- | --- | --- |
|  | 4a | 4b | 4c | 4d | 4e |
| Nominal Melt Flow Rate - Resin (dg/10 min) | 20.0 | 20.0 | 20.0 | 20.0 | 20.0 |
| Nominal Specific Weight of Resin (g/cc) | 0.955 | 0.955 | 0.955 | 0.955 | 0.955 |
| Typical Composition-Recycle Stream (mole %): | | | | | |
| Hydrogen | 26.00 | 13.00 | 13.00 | 13.00 | 26.00 |
| Nitrogen | 30.10 | — | — | — | 26.52 |
| Methane | 0.50 | 0.50 | 0.50 | 0.50 | 0.50 |
| Ethylene | 40.00 | 20.00 | 20.00 | 20.00 | 40.00 |
| Ethane | 3.00 | 66.30 | — | 26.33 | 3.00 |
| Propane | — | — | 66.30 | 39.97 | — |
| 1-Hexene | 0.4 | 0.2 | 0.2 | 0.2 | 0.4 |
| n-hexane | — | — | — | — | 3.58 |
| Dew Point of the Recycle Stream (° C.) | −5.1 | −6.1 | 41.7 | 27.0 | 55.2 |
| Inlet Temperature in the Reactor (° C.) | 30.0 | 30.0 | 44.7 | 30.0 | 12.5 |
| Operation Mode dry/condensation | dry N2 | dry ethane | dry propane | super dry | cond. |
| Liquid Content Recycle Stream- (% weight) | — | — | — | — | 13.0 |
| Heat removed in the cooler of the recycle stream ($10^8$ kJ/h) | 0.77 | 1.16 | 1.30 | 1.47 | 1.47 |
| Production Rate of the Reactor (t/h) | 21.5 | 32.5 | 36.4 | 41.3 | 41.3 |
| Catalyst productivity (g polymer/g cat) | 21,290 | 7,040 | 6,290 | 5,540 | 11,090 |

Example 5

In this Example, a process for polymerizing in a fluidized bed was used to run the copolymerization of ethylene and 1-hexene in the non condensed as well as in the condensed mode, aiming at producing a polymer useful in molding applications, subject to the following common parameters:

| | |
| --- | --- |
| Reactor Diameter: | 4.75 meters |
| Height of the bed: | 13.3 meters |
| Absolute Pressure in the reactor: | 22.4 bar |
| Reactor Temperature: | 88° C. |
| Specific Activity of the catalyst: | 700 g polymer/g catalyst/h/bar of monomer pressure |
| Superficial Velocity of the recirculating gas: | 0.75 m/s |
| Limiting Minimum Temperature to which the recirculating gas may be cooled: | 30° C. |

In this Example, the cases in the dry, super-dry and condensed modes (5a, 5b, and 5c) evidence the heat removal ability for a refrigeration up to 30° C. In cases 5d and 5e the recycle stream was refrigerated up to 19° C., temperature at which the thermal charge of the two examples are even. In the two Examples of the super-dry mode (5b and 5d), which illustrate the practice of the present invention, the mixture used as diluent shows an appropriate ratio between ethane, propane and iso-butane aiming at adjusting the volatility so that the dew point is 27° C. and 16° C., making possible to operate at 30° C. and 19° C., respectively. In the cases of the condensed mode (5c and 5e) the condensation promoter is n-hexane.

In the two cases of the non condensed operation mode at 30° C. (5a and 5b), the super-dry mode shows a reactor production rate 86% higher than that obtained by the use of the dry mode with nitrogen. In the case of the condensed mode at 30° C. (5c), even at 15.7% condensation, the production rate attained was lower than that of the super-dry mode. When the super-dry and condensed cases are cooled to 19° C. (5d and 5e), the thermal charge of both is made even and the production in the super-dry mode attains a level equivalent to the production with 18% liquid in the condensed mode.

The figures related to Example 5 are listed in TABLE 5 below.

TABLE 5

|  | Example Number | | | | |
| --- | --- | --- | --- | --- | --- |
|  | 5a | 5b | 5c | 5d | 5e |
| Nominal Melt Flow Rate - Resin (dg/10 min) | 20 | 20 | 20 | 20 | 20 |
| Nominal Specific Gravity of Resin (g/cc) | 0.955 | 0.955 | 0.955 | 0.955 | 0.955 |
| Typical Composition-Recycle Stream (mole %): | | | | | |
| Hydrogen | 26.00 | 13.00 | 26.00 | 13.00 | 26.00 |
| Nitrogen | 30.10 | — | 24.82 | 0.00 | 24.82 |
| Methane | 0.50 | 0.50 | 0.50 | 0.50 | 0.50 |
| Ethylene | 40.00 | 20.00 | 40.00 | 20.00 | 40.00 |
| Ethane | 3.00 | 36.90 | 3.00 | 42.74 | 3.00 |
| Propane | — | 23.40 | — | 23.40 | — |
| iso-butane | — | 6.00 | — | 0.16 | — |

TABLE 5-continued

|  | Example Number | | | | |
|---|---|---|---|---|---|
|  | 5a | 5b | 5c | 5d | 5e |
| 1-hexene | 0.40 | 0.20 | 0.40 | 0.20 | 0.40 |
| n-hexane | — | — | 5.28 | — | 5.28 |
| Dew Point of the Recycle Stream (° C.) | −5.1 | 27.0 | 66.5 | 16.0 | 66.5 |
| Inlet Temperature of the Reactor (° C.) | 30.0 | 30.0 | 30.0 | 19.0 | 19.0 |
| Operation Mode (dry/condensation) | dry N2 | super-dry | cond. | super-dry | cond. |
| Liquid - Recycle Stream (% weight) | — | — | 15.7 | — | 18.0 |
| Heat removed in the cooler of the recycle stream (108 kJ/h) | 0.82 | 1.53 | 1.44 | 1.70 | 1.70 |
| Production Rate of Reactor (t/h) | 23.0 | 42.9 | 40.4 | 47.7 | 47.7 |
| Catalyst Productivity (g polymer/g cat) | 19,910 | 5,340 | 11,330 | 4,800 | 9,600 |

Example 6

In this Example, a process for polymerizing in a fluidized bed was used to run the copolymerization of ethylene and 1-octene in the non condensed mode at different compositions of inert, subject to the following common parameters:

| | |
|---|---|
| Reactor Diameter: | 4.75 meters |
| Height of the bed: | 13.3 meters |
| Absolute Pressure in the reactor: | 22.4 bar |
| Reactor Temperature: | 88° C. |
| Specific Activity of the catalyst: | 700 g polymer/g catalyst/h/bar of monomer pressure |
| Superficial Velocity of the recirculating gas: | 0.75 m/s |
| Limiting Minimum Temperature to which the recirculating gas may be cooled: | 45° C. |

In this Example, the cases in the dry and super dry mode (6a, 6b, 6c and 6d) evidence the heat removal ability for a refrigeration up to 45° C. Thus, in the dry case with nitrogen (6a), as well as in the dry case with ethane (6b), the cooling limit up to the dew point cannot be met, since the maximum possible cooling is up to the temperature of 45° C. In the dry case with propane (6c), the cooling was limited to 57.1° C., being kept 3° C. above the dew point. In the case of the super-dry mode (6d), which represents the practice of the present invention, a mixture having an adequate ratio of ethane and propane was used as diluent, aiming at adjusting the volatility so that the dew point would be 42° C., with the operation at 45° C.

It is found that in the four presented cases, the operation in the super-dry mode presents the highest reactor production rate.

The figures related to Example 6 are listed in TABLE 6 below.

TABLE 6

|  | Example Number | | | |
|---|---|---|---|---|
|  | 6a | 6b | 6c | 6d |
| Nominal Melt Flow Rate - Resin (dg/10 min) | 1 | 1 | 1 | 1 |
| Nominal Specific Weight of Resin (g/cc) | 0.924 | 0.924 | 0.924 | 0.924 |
| Typical Composition - Recycle Stream (mole %): | | | | |
| Hydrogen | 4.80 | 4.80 | 4.80 | 4.80 |
| Nitrogen | 73.36 | — | — | — |
| Ethylene | 21.60 | 21.60 | 21.60 | 21.60 |
| Ethane | — | 73.36 | — | 33.76 |
| Propane | — | — | 73.36 | 39.60 |
| Octene-1 | 0.24 | 0.24 | 0.24 | 0.24 |
| Dew Point of the Recycle Stream (° C.) | 31.6 | 29.3 | 29.3 | 42.0 |
| Inlet Temperature in the Reactor (° C.) | 45.0 | 45.0 | 45.0 | 45.0 |
| Operation Mode (dry/condensation) | dry N2 | dry ethane | dry propane | super-dry |
| Liquid Content - Recycle Stream (% weight) | — | — | — | — |
| Heat removed in the cooler of the recycle stream (108 kJ/h) | 0.54 | 1.00 | 1.12 | 1.27 |
| Production Rate of Reactor (t/h) | 15.2 | 28.1 | 31.4 | 35.6 |
| Catalyst Productivity (g polymer/g cat) | 16,260 | 8,800 | 7,870 | 6,940 |

Example 7

In this Example, a process for polymerizing in a fluidized bed was used to carry out the homopolymerization of ethylene in the non condensed mode to produce a high density polyethylene.

| | |
|---|---|
| Reactor Diameter: | 4.75 meters |
| Height of the bed: | 13.3 meters |
| Absolute Pressure in the reactor: | 22.4 bar |
| Reactor Temperature: | 88° C. |
| Specific Activity of the catalyst: | 1,500 g polymer/g catalyst/h/bar of monomer pressure |
| Superficial Velocity of the recirculating gas: | 0.75 m/s |
| Limiting Minimum Temperature to which the recirculating gas may be cooled: | 35° C. |

In this Example, the cases in the dry and super-dry mode (7a, 7b, 7c and 7d) demonstrate the heat removal ability where the refrigeration was carried until the temperature of 35° C. Thus in the dry and nitrogen case (7a) as well as in the case dry and ethane (7b), the limiting cooling until the dew point cannot be met, since the maximum possible cooling is up to the temperature of 35° C. In the two cases of the super-dry mode that illustrate the practice of the present invention, the diluents used comprised i) a mixture of suitable ratio among ethane, propane and iso-butane (7c) and ii) a mixture having adjusted concentrations of ethane and neopentane (7d), aiming at adjusting the volatility so that the dew point could reach 32° C., and the operation could be effected at 35° C.

It is found that from the four cases listed, the two super-dry mode operations are the ones that present the higher production rate by the reactor.

Figures related to Example 7 are listed in TABLE 7 below.

Example 8

In this Example, a process for polymerizing in a fluidized bed was used to carry out the homopolymerization of propene in the non condensed mode to produce polypropylene:

| | |
|---|---|
| Reactor Diameter: | 2.0 meters |
| Height of the bed: | 6.0 meters |
| Absolute Pressure in the reactor: | 22.4 bar |
| Reactor Temperature: | 80° C. |
| Specific Activity of the catalyst: | 500 g polymer/g catalyst/h/bar of monomer pressure |
| Superficial Velocity of the recirculating gas: | 0.70 m/s |
| Limiting Minimum Temperature to which the recirculating gas may be cooled: | 35° C. |

In this Example, the cases in the dry and super-dry mode (8a, 8b, 8c and 8d) demonstrate the heat removal ability where the refrigeration was carried until the temperature of 35° C., exception made to case 8b and propane, where the refrigeration was limited to 3° C. above the dew point of the stream. Thus in the dry and nitrogen case (8a), the limiting cooling until the dew point cannot be met, since the maximum possible cooling is up to the temperature of 35° C. In the two cases of the super-dry mode that illustrate the practice of the present invention, the diluents used comprised a mixture of suitable ratio between ethane and propane (8c) and between nitrogen and propane (8d), aiming at adjusting the volatility so that the dew point could reach 32° C., and the operation could be effected at 35° C.

It is found from the four cases listed, that the two super-dry mode operations are the ones that present the higher production rate by the reactor.

The figures related to Example 8 are listed in TABLE 8 below.

TABLE 7

| | Example | | | |
|---|---|---|---|---|
| | 7a | 7b | 7c | 7d |
| Nominal Melt Flow Rate - Resin (dg/10 min) | 50 | 50 | 50 | 50 |
| Nominal Specific Weight - Resin (g/cc) | 0.960 | 0.960 | 0.960 | 0.960 |
| Typical Composition - Recycle Stream (mole %): | | | | |
| Hydrogen | 27.00 | 27.00 | 27.00 | 27.00 |
| Nitrogen | 35.50 | — | — | — |
| Methane | 0.50 | 0.50 | 0.50 | 0.50 |
| Ethylene | 35.00 | 35.00 | 35.00 | 35.00 |
| Ethane | 2.00 | 37.50 | 3.75 | 26.47 |
| Propane | — | — | 19.05 | — |
| iso-butane | — | — | 14.70 | — |
| Neo-pentane | — | — | — | 11.03 |
| Dew Point of the Recycle Stream (° C.) | −62.4 | −29.5 | 32.0 | 32.0 |
| Inlet Temperature of Reactor (° C.) | 35.0 | 35.0 | 35.0 | 35.0 |
| Operation Mode (dry/condensation) | dry N2 | dry ethane | super-dry | super-dry |
| Liquid Content - Recycle Stream (% weight) | — | — | — | — |
| Heat removed In the cooler of the recycle stream (108 kJ/h) | 0.616 | 0.832 | 1.112 | 1.017 |
| Production Rate of Reactor (t/h) | 16.0 | 21.6 | 28.9 | 26.4 |
| Catalyst Productivity (g polymer/g cat) | 53,650 | 39,740 | 29,700 | 32,520 |

TABLE 8

|  | Example Number | | | |
| --- | --- | --- | --- | --- |
| Typical Composition - Recycle stream (mole %): | 8a | 8b | 8c | 8d |
| Hydrogen | 6.40 | 6.40 | 6.40 | 6.40 |
| Nitrogen | 45.10 | — | — | 25.05 |
| Methane | 0.50 | 0.50 | 0.50 | 0.50 |
| Ethane | — | — | 37.10 | — |
| Propane | — | 45.10 | 8.00 | 20.05 |
| Propene | 48.00 | 48.00 | 48.00 | 48.00 |
| Dew Point of the Recycle stream (° C.) | 14.7 | 50.9 | 32.0 | 32.0 |
| Inlet Temperature in the Reactor (° C.) | 35.0 | 53.9 | 35.0 | 35.0 |
| Operation Mode (dry/condensation) | dry $N_2$ | dry propane | super-dry | super-dry |
| Liquid Content - Recycle Stream (% weight) | — | — | — | — |
| Heat removed in the cooler of the recycle stream ($10^7$ kJ/h) | 1.502 | 1.694 | 2.326 | 1.995 |
| Production Rate of Reactor (t/h) | 6.8 | 7.7 | 10.6 | 9.1 |
| Catalyst Productivity (g polymer/g cat) | 4,620 | 4,080 | 2,960 | 3,450 |

What is claimed is:

1. A process for polymerizing and copolymerizing olefin monomers in a gas phase reactor, under polymerization conditions and in the presence of high-activity catalysts, employing a recycle gas stream cooled in a heat exchanger with the aid of a cooling fluid, wherein in said process, the inert diluents of said recycle stream comprise:
    at least one light component designed to regulate the dew point;
    at least one intermediate volatility component,
        the composition of which is suitable to keep the recycle stream completely volatilized.

2. A process according to claim 1, wherein the adjustment of the dew point of the recycle stream is effected by the control of the composition of the mixture of said inert diluents.

3. A process according to claim 1 or 2, wherein the adjustment of the dew point of the recycle stream is effected as a function of the temperature of the cooling fluid, used to cool said stream.

4. A process according to claim 1, wherein the production rate is the same or higher than the production rate in a condensed mode corresponding to a condensation of 3 weight % for the same set of process conditions.

5. A process according to claim 1, wherein the monomers are ethylene, propene, 1-butene, 1-pentene, 4-methyl-1-pentene, 1-hexene, 1-octene, olefins up to 12 carbon atoms, styrene, polar vinyl's, conjugated and non-conjugated dienes, aldehyde and acetylene monomers, isolated or copolymerized.

6. A process according to claim 1 or 5, wherein ethylene is homopolymerized or copolymerized with propene, 1-butene, 1-hexene, 1-octene or other linear or branched alpha-olefins of from 4 to 12 carbon atoms.

7. A process according to claim 1 or 5, wherein propene is homopolymerized or copolymerized with ethylene, 1-butene, 1-hexene, 1-octene or other linear or branched alpha-olefins of from 4 to 12 carbon atoms.

8. A process according to claim 1, wherein the light components designed to regulate the dew point are nitrogen, argon, ethane and propane, isolated or combined.

9. A process according to claim 1, wherein the intermediate volatility components are alkanes of from 3 to 6 carbon atoms and non-reactive olefins of from 4 to 6 carbon atoms, isolated or combined.

10. A process according to claim 1 or 9, wherein the intermediate volatility components are propane, n-butane, iso-butane, iso-pentane, neo-pentane, n-pentane, cyclo-pentane, cis-2-butene, trans-2-butene, cis-2-pentene and trans-2-pentene, isolated or combined.

11. A process according to any one of claims 1, 8 and 9, wherein the light component designed to regulate the dew point is ethane and the intermediate volatility component is propane.

12. A process according to any one of claims 1, 8 and 9, wherein the light component designed to regulate the dew point is propane and the intermediate volatility component is iso-butane.

13. A process according to claim 1, wherein the ratio between the light components designed to regulate the dew point and the overall amount of non-reactive components present in the composition of the gaseous recycle stream is between 3% and 97 mole %, preferably between 10% and 90 mole %.

14. A process according to claim 1, wherein the ratio between each non-reactive component and the main monomer is lower than 6:1.

15. A process according to claim 1, wherein the gas phase reactors are vertical fluidized bed reactors, horizontal fluidized bed reactors, horizontal stirred-bed reactors and vertical stirred-bed reactors.

16. A process according to claim 1, wherein the time specific activity of said polymerization catalyst is at least 500 g polymer/g catalyst/h/bar monomer pressure.

17. A process according to claim 1 or 16, wherein the catalyst productivity is higher than 2,000 grams of polymer per gram of catalyst, preferably higher than 3,000 grams of polymer per gram of catalyst, on a continuous basis.

18. A process according to claim 1 or 16, wherein the catalysts used comprise anionic coordination catalysts, cationic catalysts, free radical catalysts, catalysts using a transition metal catalyst, and metallocene catalysts reacted with an alkyl or alcoxy metal or with an ionic compound.

19. A process according to claim 1 or 16, wherein the catalysts are based on organic and inorganic chromium salts, metallocene catalysts and titanium chloride catalysts of the Ziegler-Natta class.

20. A process according to claim 1 or 16, wherein the catalysts contain one or more electron donor compounds of the ester, ether and organo-silane classes.

21. A process according to claim 1 or 16, wherein the catalysts are activated with aluminum alkyls.

22. A process according to claim 1 or 16, wherein the catalysts are deposited on magnesium chloride or silica supports.

23. A process according to claim 1 or 16, wherein the catalysts are pre-polymerized.

* * * * *